United States Patent
Jung

(10) Patent No.: US 8,268,483 B2
(45) Date of Patent: *Sep. 18, 2012

(54) POUCH-TYPE SECONDARY BATTERY

(75) Inventor: Dong-Woo Jung, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/196,167

(22) Filed: Aug. 2, 2011

(65) Prior Publication Data

US 2011/0287294 A1 Nov. 24, 2011

Related U.S. Application Data

(63) Continuation of application No. 12/036,006, filed on Feb. 22, 2008, now Pat. No. 8,034,481.

(30) Foreign Application Priority Data

May 21, 2007 (KR) .......................... 10-2007-0049249

(51) Int. Cl.
H01M 4/02 (2006.01)
(52) U.S. Cl. .................. 429/211; 429/209; 429/247
(58) Field of Classification Search .................. None
See application file for complete search history.

(56) References Cited

U.S. PATENT DOCUMENTS

| | | | |
|---|---|---|---|
| 6,797,429 B1 | 9/2004 | Komatsu | 429/163 |
| 7,008,721 B2 | 3/2006 | Yamashita et al. | 429/184 |
| 2001/0038941 A1* | 11/2001 | Sunano | 429/66 |
| 2005/0014036 A1* | 1/2005 | Kim | 429/7 |

FOREIGN PATENT DOCUMENTS

| | | |
|---|---|---|
| CN | 1574443 | 2/2005 |
| CN | 1753204 | 3/2006 |
| JP | 2000-277093 | 10/2000 |
| JP | 2000-353502 | 12/2000 |
| JP | 2005-019404 | 1/2005 |
| JP | 2006-252802 | 9/2006 |
| KR | 20-2000-0007977 | 6/2000 |
| KR | 10-0516774 | 4/2005 |
| KR | 10-2006-0033146 | 4/2006 |
| KR | 10-2006-0112035 | 10/2006 |

OTHER PUBLICATIONS

Chinese Patent Application No. 200810091264.7, issued Aug. 14, 2009.

Japanese Office Action issued Mar. 15, 2011 in corresponding Japanese Patent Application No. 2007-243813.

Office Action issued May 16, 2008 in corresponding Korean Patent Application No. 10-2007-0049249.

* cited by examiner

Primary Examiner — Barbara Gilliam
Assistant Examiner — Stephan Essex
(74) Attorney, Agent, or Firm — Knobbe, Martens, Olson & Bear LLP

(57) ABSTRACT

A pouch-type secondary battery including: an electrode assembly comprising a positive electrode plate, a negative electrode plate and a separator; a negative electrode tab electrically connected to the negative electrode plate and having a first tab tape; and a positive electrode tab electrically connected to the positive electrode plate and having a second tab tape wherein one or two of end portions which the positive electrode tab crosses are located inside a sealing portion.

8 Claims, 6 Drawing Sheets

POUCH-TYPE SECONDARY BATTERY

CROSS-REFERENCE TO RELATED APPLICATIONS

This application is a continuation of U.S. patent application Ser. No. 12/036,006 entitled "POUCH-TYPE SECONDARY BATTERY" filed on Feb. 22, 2008, which claims priority to and the benefit of Korean Patent Application No. 10-2007-0049249, filed May 21, 2007 in the Korean Intellectual Property Office, the entire content of both of which are incorporated by reference herein.

BACKGROUND

1. Technical Field

The present disclosure relates a pouch-type secondary batter, and more particularly, to a pouch-type secondary battery exhibiting reduced swelling and corrosion of a cladding.

2. Description of the Related Art

As a portable electronic devices such as video cameras, portable phones, and portable computers become lighter while increasing performance, research is active on secondary batteries used as their power sources. Examples of suitable secondary batteries include nickel-cadmium batteries, nickel-hydride batteries, nickel-zinc batteries, and lithium secondary batteries.

Of these types of secondary batteries, lithium secondary batteries are widely used in many industrial fields because of small size, high capacity, high operating voltages, and excellent energy densities per unit weight. Lithium secondary batteries are classified according to the type of electrolyte as lithium ion batteries using a liquid electrolyte, and lithium polymer batteries using a polymer electrolyte.

Lithium secondary batteries are also classified according to the shape of the can into which the electrode assembly is inserted into cylinder-type, prism-type, and pouch-type batteries. A pouch-type secondary battery comprises a pouch cladding, which typically has a multi-layer structure comprising a metal foil layer and resin layers coated on top and bottom surfaces of the metal foil layer. Thus, the pouch-type is typically much lighter in weight than the cylindrical type or the prism type. Accordingly, it is possible to significantly reduce the weight of a secondary battery and to provide a variety of shapes using a pouch-type secondary battery.

A typical pouch-type secondary battery comprises an upper cladding and a lower cladding, formed, for example, by folding a rectangular cladding longitudinally. The lower cladding has a space formed therein by, for example, press processing. The space in the lower cladding accommodates an electrode assembly in a "jelly roll" form in which a sandwich of a positive electrode plate, a separator and a negative electrode plate is rolled-up. In a sealed pouch-type secondary battery, edges of the lower cladding are sealed to corresponding edges of the upper cladding are sealed to each other and the package pressurized.

Electrode tabs for providing an electrical connection with an external device are formed in the positive electrode plate and the negative electrode plate of the electrode assembly. The electrode tabs protrude from the electrode assembly axially relative to the winding axis of the jelly roll, and through a side of the sealed cladding. The electrode tabs are typically aluminum, copper, or nickel, with a thickness and size sufficient to serve as a current path without a large voltage drop.

In order to improve adhesion between a polymer layer inside the cladding and the electrode tab, the surface of the polymer layer may contain an adhesive, or an adhesive tape may be attached to the portion of the electrode tab that overlaps the cladding.

When thermally fusing the upper and lower claddings to each other, if the temperature and pressure are excessively high, or if fused too long, the polymer layer inside the cladding may be pushed out or get damaged, thereby causing a short circuit between the electrode tab and the metal foil of the cladding. If a short circuit occurs between the electrode tab and the metal foil, the battery discharges between the two electrode tabs through the metal foil, resulting in overheating and/or swelling, and thereby lowering the manufacturing yield. If a short circuit occurs between the negative electrode tab and the metal foil of the cladding, biasing the metal foil to a negative potential. At a metal corrosion potential of less than about 1 volt, corrosion of the metal foil occurs.

As a result, as a sealing capability of the cladding is degraded, an organic electrolyte in the electrode assembly may be evaporated, and external humidity and oxygen penetrates the cladding, generating gas therein causing swelling of the cladding.

SUMMARY OF THE INVENTION

Some embodiments provide a pouch-type secondary battery in which corrosion and swelling of the cladding are prevented by intentionally short-circuiting a metal layer of the cladding with the positive electrode tab.

Some embodiments provide a pouch-type secondary battery, comprising: an electrode assembly comprising a positive electrode plate, a negative electrode plate and a separator; a negative electrode tab electrically connected to the negative electrode plate and having a first tab tape; and a positive electrode tab electrically connected to the positive electrode plate and having a second tab tape wherein one or two of end portions which the positive electrode tab crosses are located inside a sealing portion.

Other embodiments provide a pouch-type secondary battery, comprising: an electrode assembly comprising a positive electrode plate, a negative electrode plate and a separator; a cladding accommodating the electrode assembly; a negative electrode tab electrically connected to the negative electrode plate and having a first tab tape; and a positive electrode tab electrically connected to the positive electrode plate and having a second tab tape having the thinner thickness than the first tab tape.

The second tab tape is made of a softer material than the first tab tape.

The cladding comprises a metal layer made of a metal; a thermal fusing layer formed on one side of the metal layer; and an insulating layer formed on the opposite side of the metal layer to the thermal fusing layer.

The metal layer is in a state of being electrically connected to the positive electrode tab.

Some embodiments provide a pouch-type secondary battery, comprising: a cladding comprising a sealing portion; an electrode assembly comprising a positive electrode plate, a negative electrode plate, and a separator, wherein the electrode assembly is disposed in the cladding; a negative electrode tab electrically coupled to the negative electrode plate and extending out of the cladding through the sealing portion; a positive electrode tab electrically coupled to the positive electrode plate and extending out of the cladding through the sealing portion; a first tab tape disposed between the negative electrode tab and the sealing portion; and a second tab tape disposed between the positive electrode tab and the sealing portion, wherein the second tab tape comprises a first end distal to the electrode assembly and a second end proximal to the electrode assembly, and at least one of the first end and the second end of the second tab tape is located inside the sealing portion.

In some embodiments, the cladding comprises: an upper cladding; and a lower cladding comprising a space dimensioned to receive the electrode assembly, wherein the upper cladding and lower cladding share an edge.

In some embodiments, the sealing portion comprises: an upper sealing portion disposed on an edge of the upper cladding; and a lower sealing portion disposed on an edge of the lower cladding.

In some embodiments, the cladding comprises: a thermal fusing layer; an insulating layer; and a metal layer disposed between the thermal fusing layer and the insulating layer. In some embodiments, the metal layer is electrically coupled to the positive electrode tab. In some embodiments, the metal layer comprises an aluminum-based material. In some embodiments, the thermal fusing layer comprises cast polypropylene (CPP).

In some embodiments, the second tab tape comprises a softer material than the first tab tape. In some embodiments, the second tab tape is thinner than the first tab tape. In some embodiments, the second tab tape comprises a material having a lower fusing point than the first tab tape.

In some embodiments, the positive electrode tab is thicker than the negative electrode tab. In some embodiments, a sum of a thickness of the positive electrode tab and a thickness of the second tab tape is about equal to a sum of a thickness of the negative electrode tab and a thickness of the first tab tape.

Some embodiments provide a pouch-type secondary battery, comprising: an electrode assembly comprising a positive electrode plate, a negative electrode plate, and a separator; a cladding receiving the electrode assembly; a negative electrode tab electrically coupled to the negative electrode plate; a first tab tape disposed on the negative electrode tab; a positive electrode tab electrically coupled to the positive electrode plate; and a second tab tape disposed on the positive electrode, wherein the second tab tape is thinner than the first tab tape.

In some embodiments, the cladding comprises: an upper cladding having an upper sealing portion disposed on an edge thereof; and a lower cladding having a lower sealing portion disposed on an edge thereof, wherein the lower cladding comprises a space for accommodating the electrode assembly.

In some embodiments, the cladding comprises: a metal layer comprising a first side and a second side; a thermal fusing layer formed on the first side of the metal layer; and an insulating layer formed on the second side of the metal layer. In some embodiments, the metal layer is electrically coupled to the positive electrode tab. In some embodiments, the metal layer comprises an aluminum-based material. In some embodiments, the thermal fusing layer comprises cast polypropylene (CPP).

In some embodiments, the second tab tape comprises a softer material than the first tab tape. In some embodiments, the second tab tape comprises a material having a lower fusing point than the first tab tape.

In some embodiments, the positive electrode tab is thicker than the negative electrode tab. In some embodiments, a sum of a thickness of the positive electrode tab and a thickness of the second tab tape is about equal to a sum of a thickness of the negative electrode tab and a thickness of the first tab tape.

BRIEF DESCRIPTION OF THE DRAWINGS

The above and other features and advantages will become more apparent to those of ordinary skill in the art by describing in detail preferred embodiments thereof with reference to the attached drawings in which.

DETAILED DESCRIPTION OF CERTAIN EMBODIMENTS

Figure 1A:
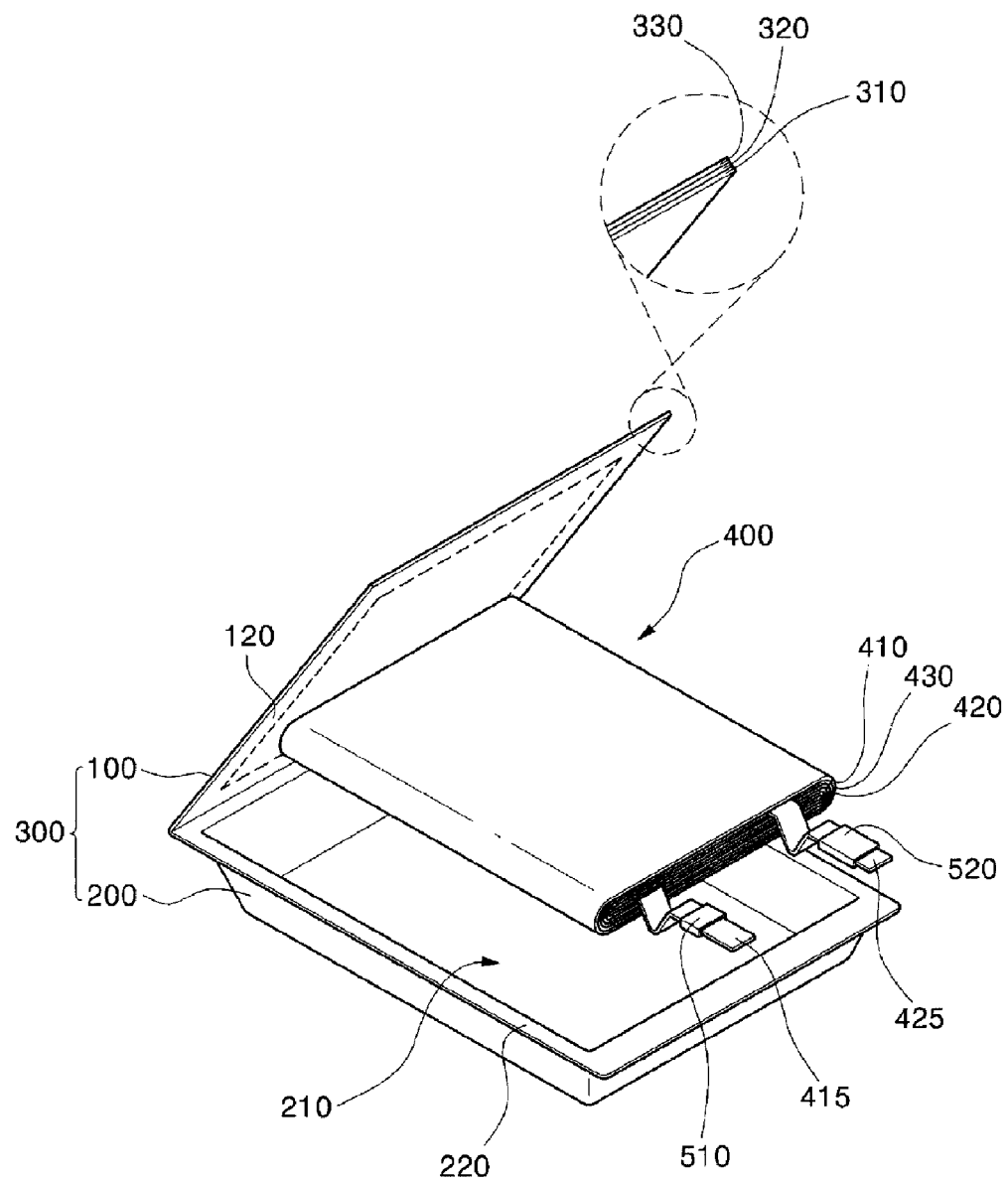
FIG. 1a is an exploded perspective view illustrating a pouch-type secondary battery according to a first exemplary embodiment.

Exemplary embodiments will now be described more fully hereinafter with reference to the accompanying drawings. In the drawings, the thickness of layers and regions are exaggerated for clarity. Like numbers refer to like elements throughout the specification.

Figure 1B:
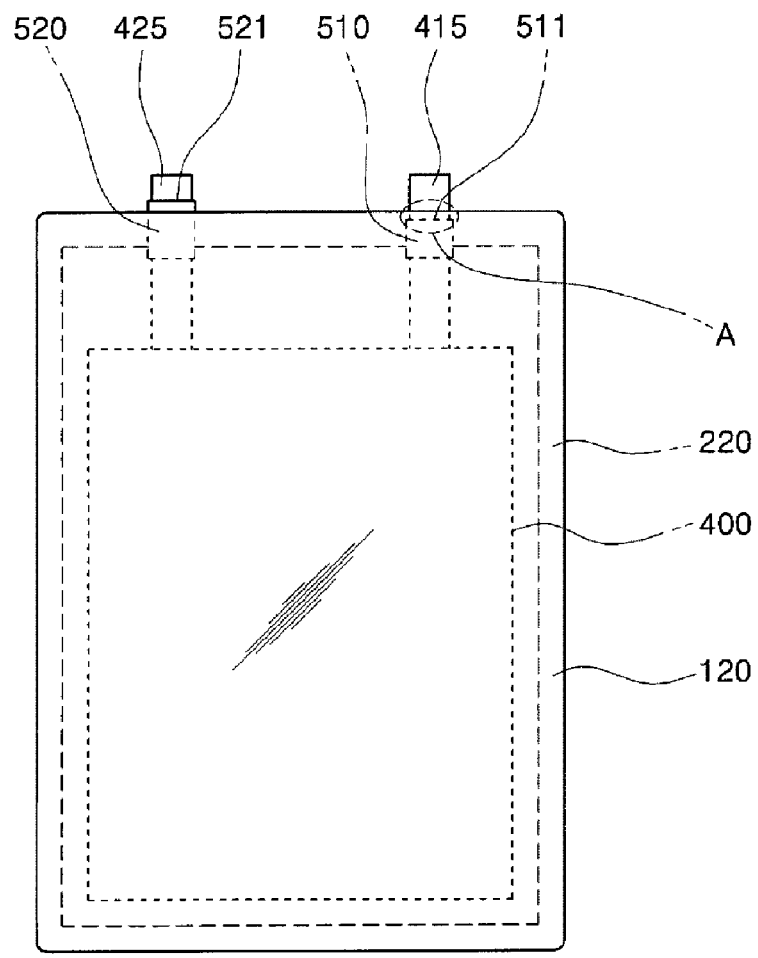
FIG. 1b is a top view illustrating an assembled pouch-type secondary battery according to the first exemplary embodiment.
Figure 1C:
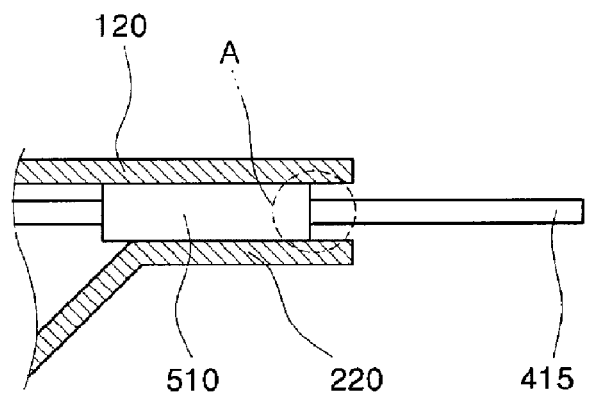
FIG. 1c is a side cross-sectional view illustrating a positive electrode tab portion of the pouch-type secondary battery according to the first exemplary embodiment.

FIG. 1a is an exploded perspective view illustrating a pouch-type secondary battery according to a first exemplary embodiment. FIG. 1b is a top view illustrating an assembled pouch-type secondary battery according to the first exemplary embodiment. FIG. 1c is a side cross-sectional view illustrating a positive electrode tab portion of the pouch-type secondary battery according to the first exemplary embodiment.

Referring to FIGS. 1a to 1c, the illustrated pouch-type secondary battery in a bare cell form comprises an electrode assembly 400 sealed in a cladding 300, which comprises upper and lower claddings 100 and 200.

In other embodiments, in the pouch-type secondary battery has a core pack form in which a printed circuit board comprising safety elements, for example, a protection circuit, a PTC element, and/or a thermistor, is electrically coupled the secondary battery and a protection circuit board, thereby preventing accidents caused by abnormal operation of the battery, such as overheating, overcharging, and overdischarging. Some embodiments further comprise a metal case for protecting an appearance of the pouch-type secondary battery core pack.

In the illustrated embodiment, the lower and upper claddings 100 and 200 share a common edge, while the other edges are open to receive the electrode assembly 400.

A space 210 dimensioned and configured for accommodating the electrode assembly 400 is formed in either or both of the upper and lower claddings 100 and 200 by any suitable means, for example, by press processing. In the illustrated embodiment, the space 210 is formed in the lower cladding 200. A lower sealing portion 220 is formed on edges of the lower cladding 200, and serves as a sealing surface for sealing the space 210 by thermal fusing. An upper sealing portion 120 is formed on the upper cladding 100, corresponding to the lower sealing portion 220.

The cladding 300 has a multi-layer structure comprised of a thermal fusing layer 310, which has thermal fusing characteristics to serve as a sealant, a metal layer 320, which provides mechanical strength and serves as a barrier layer against humidity and oxygen, and an insulating layer 330. The thermal fusing layer 310 is formed on one side of the metal layer 320, and the insulating layer 330 is formed on the opposite side of the metal layer 320. The metal layer 320 comprises any suitable material, for example, aluminum, steel, stainless steel, or the like. The thermal fusing layer 310 comprises cast polypropylene (CPP) or the like. The insulating layer 330 comprises polyethylene terephthalate (PET), nylon, or the like.

The electrode assembly 400 comprises a sandwich of a positive electrode plate 410, a negative electrode plate 420, and a separator 430 wound in a jelly role form. The positive electrode plate 410 has a positive active material coated thereon, and the negative electrode plate 420 has a negative active material coated thereon. The separator 430 is interposed between the positive and negative electrode plates 410 and 420 to insulate them. The positive electrode plate 410 may be made of aluminum. A positive electrode tab 415 extends axially from one side of the positive electrode plate 410 relative to the axis in which the jelly roll is wound. The negative electrode plate 420 may be made of nickel (Ni). A negative electrode tab 425 extends axially from one side of the negative electrode plate 420 relative to the axis in which the jelly roll is wound.

Adhesive tab tapes 510 and 520 are disposed on the portions of the positive and negative tabs 415 and 425 that overlap the sealing portions 120 and 220. Preferably, the tab tape 510 formed on the positive electrode tab 415 differs from the tab tape 520 formed on the negative electrode tab 425 such that the positive electrode tab 415 may be easily short-circuited with the metal layer 320 of the cladding when the upper and lower sealing portions 120 and 220 are thermally fused to each other.

In a detail illustrated in region A in FIGS. 1b and 1c, the tab tape 510 of the positive electrode tab 415 comprises an end portion 511 distal to the electrode assembly 400 that does not extend to the outward edges of the sealing portions 120 and 220, that is, is recessed from the outer edge of the sealing portions 120 and 220, and as such, does not completely isolate the tab 415 from the sealing portions 120 and 220. In the case of the tab tape 520 of the negative electrode tab 425, an end portion 521 protrudes from the sealing portions 120 and 220, thereby isolating the negative electrode tab 425 from the sealing portions 120 and 220.

Therefore, the tab tape 520 of the negative electrode tab 425 wraps the negative electrode tab 425 such that the negative electrode tab 425 will not be short-circuited with the sealing portions 120 and 220, whereas as in region A, the positive electrode tab 415 and the sealing portions 120 and 220 are directly thermally fused to each other without intervention of the tab tape 510 so that the positive electrode tab 415 and the metal layer of the sealing portions 120 and 220 are short-circuited.

Since the positive electrode tab 415 is short-circuited with the metal layer of the sealing portions 120 and 220, the metal layer does not reach a corrosion potential of less than about 1 volt, thereby preventing corrosion and swelling in the cladding.

The tab tape 510 of the positive electrode tab 415 preferably comprises a material that is softer and/or has a lower fusing point than the tab tape 520 of the negative electrode tab 525 so that the tab tape 510 can be fused faster, thereby more easily short-circuiting the positive electrode tab 415.

Figure 2A:
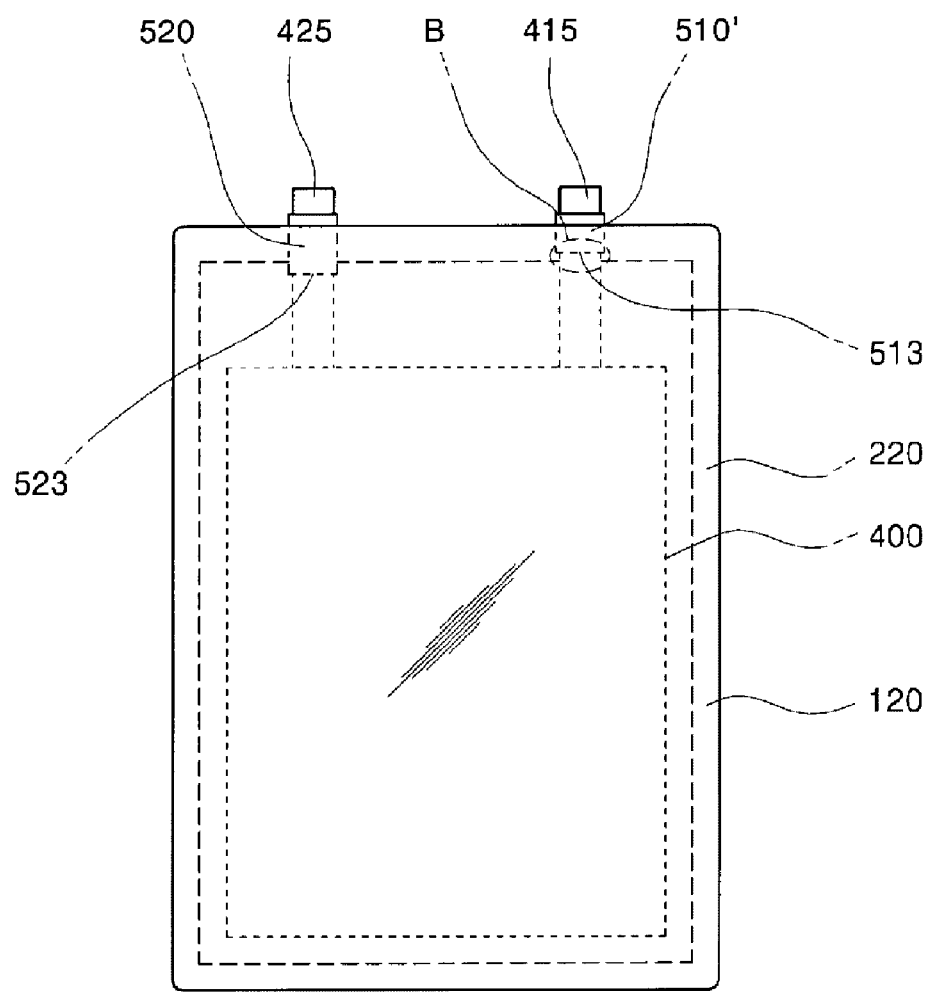
FIG. 2a is a top view illustrating an assembled pouch-type secondary battery according to a second exemplary embodiment.
Figure 2B:
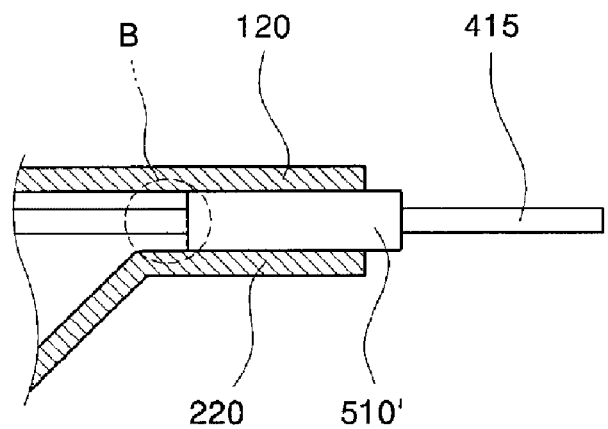
FIG. 2b is a side cross-sectional view illustrating a positive electrode tab portion of the pouch-type secondary battery according to the second exemplary embodiment.

FIGS. 2a and 2b are a top view and a side cross-sectional view illustrating an assembled state of a pouch-type secondary battery according to a second exemplary embodiment, respectively. In FIGS. 2a and 2b and FIGS. 1a to 1c, like reference numerals (e.g., 120, 220, 400, 415, 425, and 520) denote like parts, and thus detailed descriptions of those parts are omitted.

Referring to region B of FIGS. 2a and 2b, for a tab tape 510' disposed on the positive electrode tab 415, an end portion 513 of the tab tape 510' proximal to the electrode assembly 400 terminates inside the sealing portions 120 and 220, that is, is recessed from the inner edges of the sealing portions 120 and 220. For a tab tape 520 disposed on the negative electrode tab 425, an end portion 523 proximal to the electrode assembly 400 extends outside the sealing portions 120 and 220. The tab tape 520 disposed on the negative electrode tab 425 wraps the negative electrode tab 425 so that the negative electrode tab 425 is not short-circuited with the sealing portions 120 and 220, whereas as in a region B, the positive electrode tab 415 and the sealing portions 120 and 220 are directly thermally fused to each other without intervention of the tab tape 510' so that the positive electrode tab 415 and the metal layer of the sealing portions 120 and 220 are short-circuited. Since the positive electrode tab 415 is short-circuited with the metal layer of the sealing portions 120 and 220, the metal layer does not reach a corrosion potential of less than about 1 volt, thereby preventing corrosion and swelling in the cladding.

The tab tape 510' of the positive electrode tab 415 preferably comprises a material that is softer and/or has a lower fusing point than the tab tape 520 of the negative electrode tab 425 so that the tab tape 510 can be fused faster, thereby more easily short-circuiting the positive electrode tab 415.

Figure 3A:
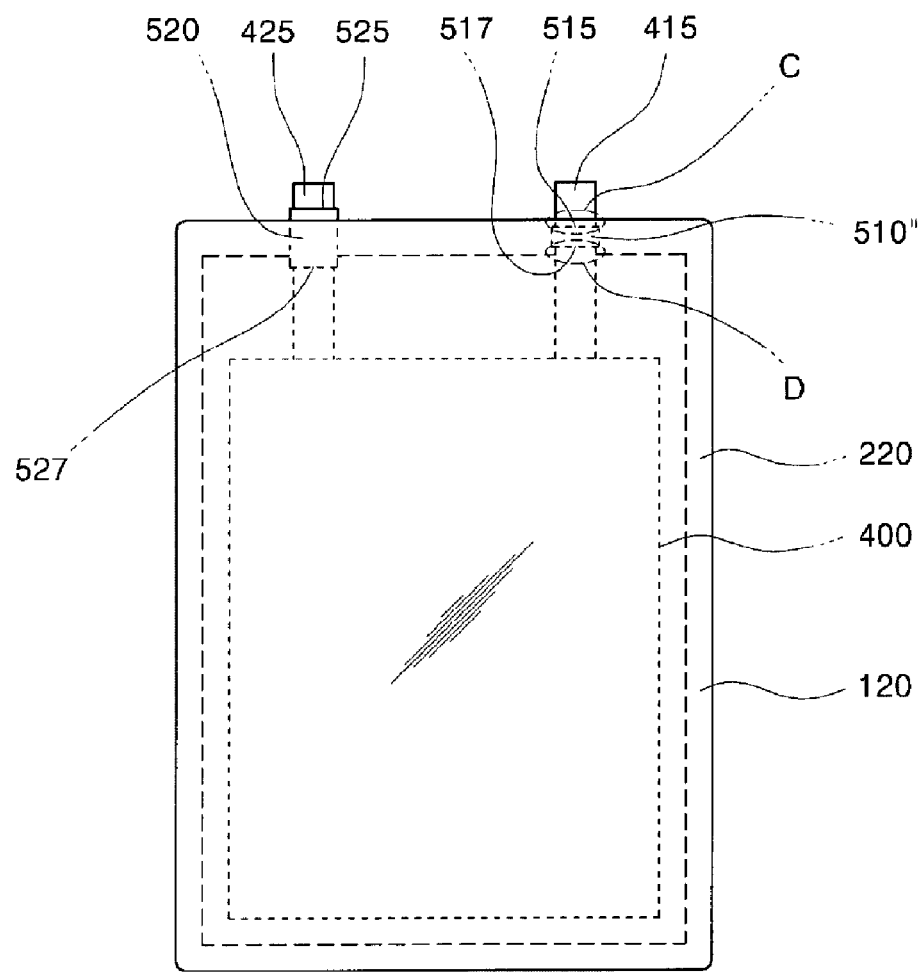
FIG. 3a is a top view illustrating an assembled pouch-type secondary battery according to a third exemplary embodiment.
Figure 3B:
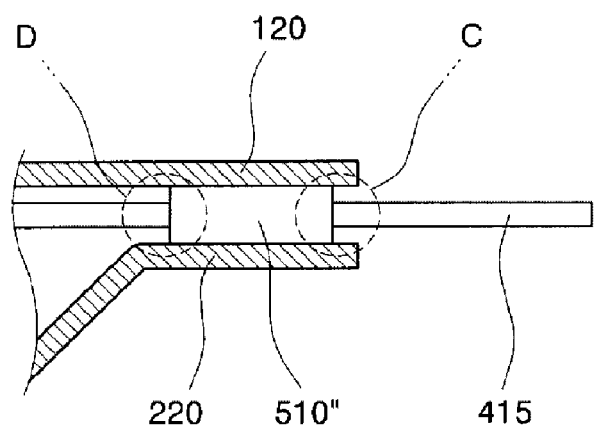
FIG. 3b is a side cross-sectional view illustrating a positive electrode tab portion of the pouch-type secondary battery according to the third exemplary embodiment.

FIGS. 3a and 3b are a top view and a side cross-sectional view illustrating an assembled state of a pouch-type secondary battery according to a third exemplary embodiment, respectively. In FIGS. 3a and 3b and FIGS. 1a to 1c, like reference numerals (e.g., 120, 220, 400, 425, and 530) denote like parts, and thus detailed descriptions of those parts are omitted.

Referring to FIGS. 3a and 3b, in the case of a tab tape 510" disposed on the positive electrode tab 415, an end portion 515 distal from the electrode assembly and an end portion 517 proximal to the electrode assembly 400 are located inside of, are recessed within, and/or do not extend outside of the sealing portions 120 and 220, as shown in regions C and D in FIGS. 3a and 3b.

In contrast, in the case of a tab tape 520 disposed on the negative electrode tab 425, an end portion 525 distal of the electrode assembly and an end portion 527 proximal to the electrode assembly 400 extend out of the sealing portions 120 and 220.

The tab tape 520 disposed on the negative electrode tab 425 wraps around the negative electrode tab 425 such that the negative electrode tab 425 does not short-circuit with the sealing portions 120 and 220, whereas as in regions C and D, the positive electrode tab 415 and the sealing portions 120 and 220 are directly fused without intervention of the tab tape 510" so that the positive electrode tab 415 and the metal layer of the sealing portions 120 and 220 are short-circuited. Since the positive electrode tab 415 is short-circuited with the metal layer of the sealing portions 120 and 220, the metal layer does not reach a corrosion potential of less than about 1 volt, thereby preventing corrosion of the cladding and swelling.

The tab tape 510" of the positive electrode tab 415 preferably comprises a material that is softer and/or has a lower fusing point than the tab tape 520 of the negative electrode tab 425 so that the tab tape 510 can be fused faster, thereby more easily short-circuiting the positive electrode tab 415.

That is, according to the first to third exemplary embodiments, of the two edges of the tab tape wrapped around the positive electrode tab, one or both edges are recessed within or located inside the sealing portions of the cladding so that the positive electrode tab and the sealing portions can be fused to each other without intervention of the tab tape and the positive electrode tab and the metal layer of the sealing portions can be easily short-circuited. Accordingly, since the positive electrode tab is short-circuited with the metal layer of the sealing portions, the metal layer does not reach a corrosion potential of less than about 1 volt, thereby preventing corrosion and swelling in the cladding.

Figure 4A:
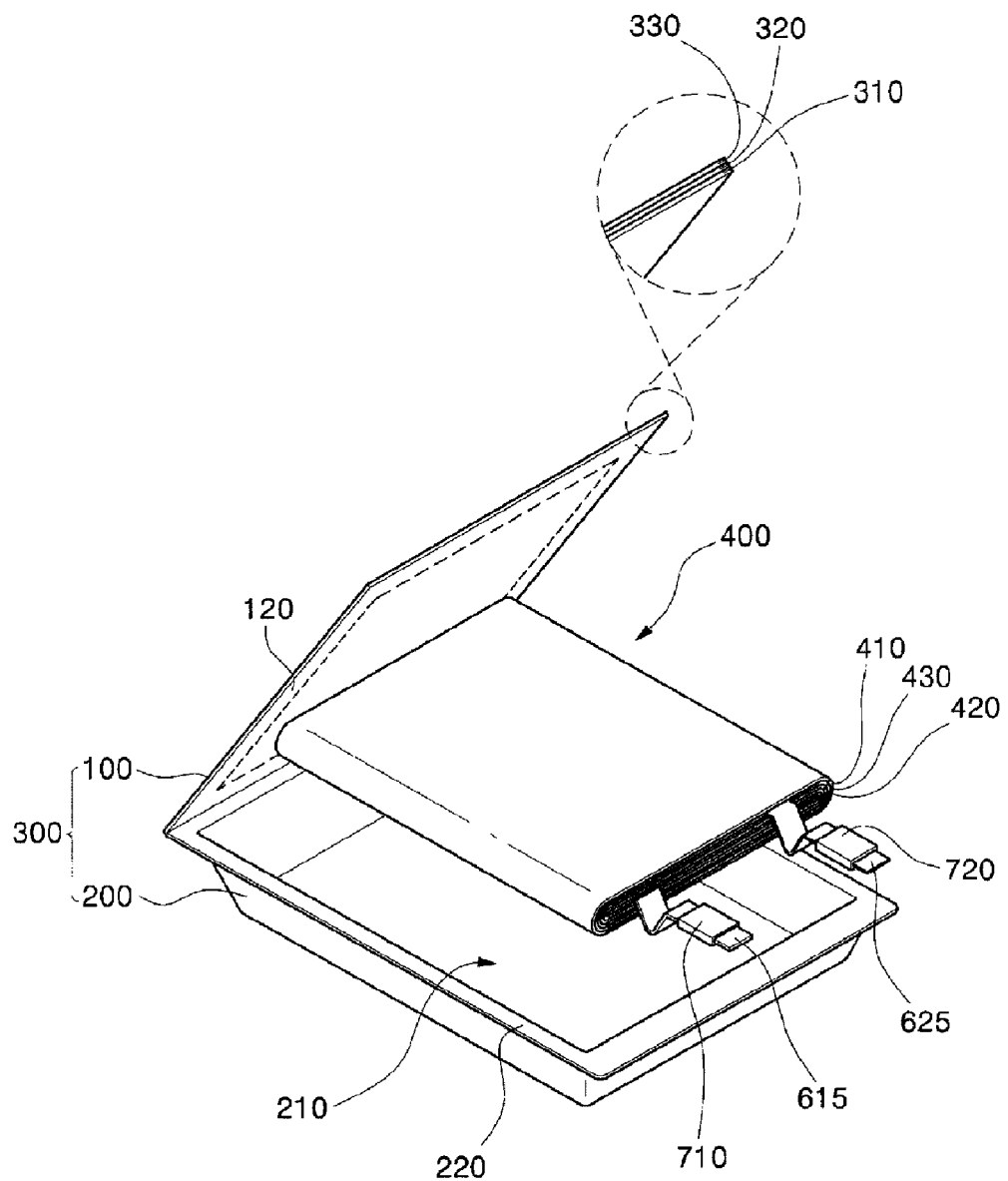
FIG. 4a is an exploded perspective view illustrating a pouch-type secondary battery according to a fourth exemplary embodiment.
Figure 4B:
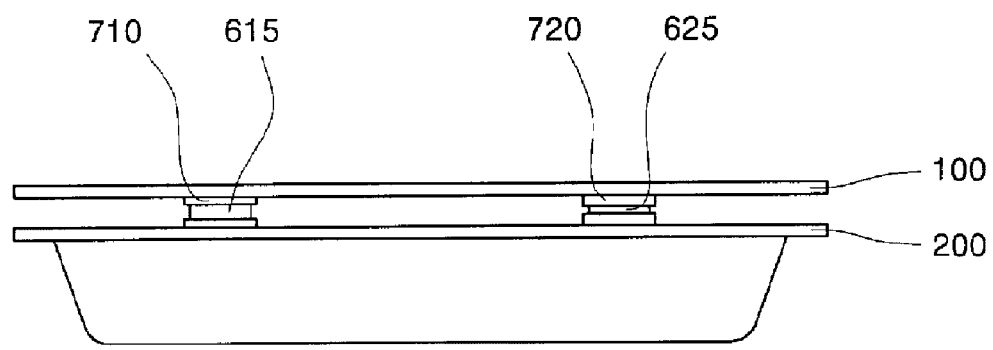
FIG. 4b is front view illustrating the pouch-type secondary battery according to the fourth exemplary embodiment.

FIGS. 4a and 4b are an exploded perspective view and a front view illustrating a pouch-type secondary battery according to a fourth exemplary embodiment. In FIGS. 4a and 4b and FIGS. 1a to 1c, like reference numerals (e.g., 100 to 430) denote like parts, and thus detailed descriptions thereof are omitted.

Adhesive tab tapes 710 and 720 are arranged on portions of a positive electrode tab 615 protruding from the positive electrode plate 410 and a negative electrode tab 625 protruding from the negative electrode plate 420 that overlap the sealing portions 120 and 220. The tab tape 710 of the positive electrode tab 615 is thinner than the tab tape 720 of the negative electrode tab 625. When the sealing portions 120 and 220 are fused at a predetermined temperature and pressure, the thinner tab tape 710 is damaged, thereby short-circuiting the positive electrode tab 615 to the metal layer 320 of the cladding. When the positive electrode tab 615 and the metal layer 320 of the sealing portions 120 and 220 are short-circuited, the metal layer 320 does not reach a corrosion potential of less than about 1 volt, thereby preventing corrosion of the cladding and swelling.

In the illustrated embodiment, the positive electrode tab 615, having the relatively thinner tab tape 710, is relatively thicker than the negative electrode tab 625, having the relatively thicker tab tape 720. A sum of the thicknesses of the positive electrode tab 615 and the tab tape 710 is about equal to a sum of the thicknesses of the positive electrode tab 625 and the tab tape 720. Accordingly, a problem of the sealing portions not fusing well because of different thickness at the positions of the tabs is solved.

The fourth exemplary embodiment has been described independently on the first to third exemplary embodiments, but the fourth exemplary embodiment can be applied to any of the first to third exemplary embodiments.

As described above, it is possible to prevent the metal layer of the cladding from corrosion and to prevent swelling caused by gas generated in the cladding.

What is claimed is:

1. A pouch-type secondary battery, comprising:
   an electrode assembly comprising two electrode plates having different polarities and a separator between the two electrode plates;
   a cladding configured to house the electrode assembly;
   a first electrode tab electrically coupled to one of the two electrode plates;
   a first insulating member surrounding the first electrode tab; and
   a second electrode tab electrically coupled to the other one of the two electrode plates; and
   a second insulating member surrounding the second electrode tab,
   wherein the second insulating member is formed of a material having a lower fusing point than the first insulating member.

2. The pouch-type secondary battery of claim 1, wherein the cladding is formed of an upper cladding and a lower cladding such that a space is formed and dimensioned to house the electrode assembly, wherein the upper cladding and the lower cladding share an edge.

3. The pouch-type secondary battery of claim 1, wherein the cladding comprises:
   a metal layer comprising a first side and a second side;
   a thermal fusing layer formed on the first side of the metal layer; and
   an insulating layer formed on the second side of the metal layer.

4. The pouch-type secondary battery of claim 3, wherein the metal layer is electrically connected to the second electrode tab.

5. The pouch-type secondary battery of claim 3, wherein the metal layer is formed of an aluminum-based material.

6. The pouch-type secondary battery of claim 3, wherein the thermal fusing layer is formed of cast polyprolylene (CPP).

7. The pouch-type secondary batter of claim 1, wherein the second insulating member is thinner than the first insulating member.

8. The pouch-type secondary batter of claim 1, wherein the second electrode tab is thicker than the first electrode tab.

* * * * *